Figure 1:
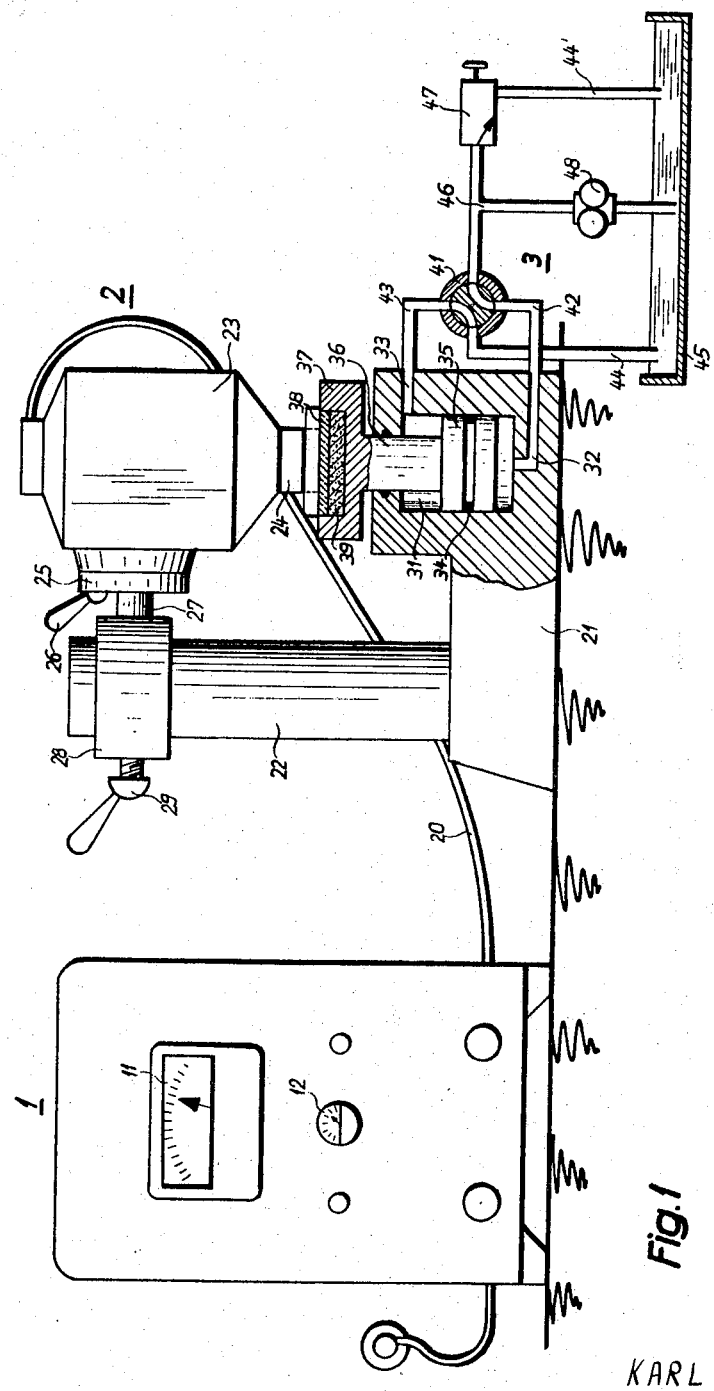

INVENTOR
KARL KARRER

INVENTOR
KARL KARRER

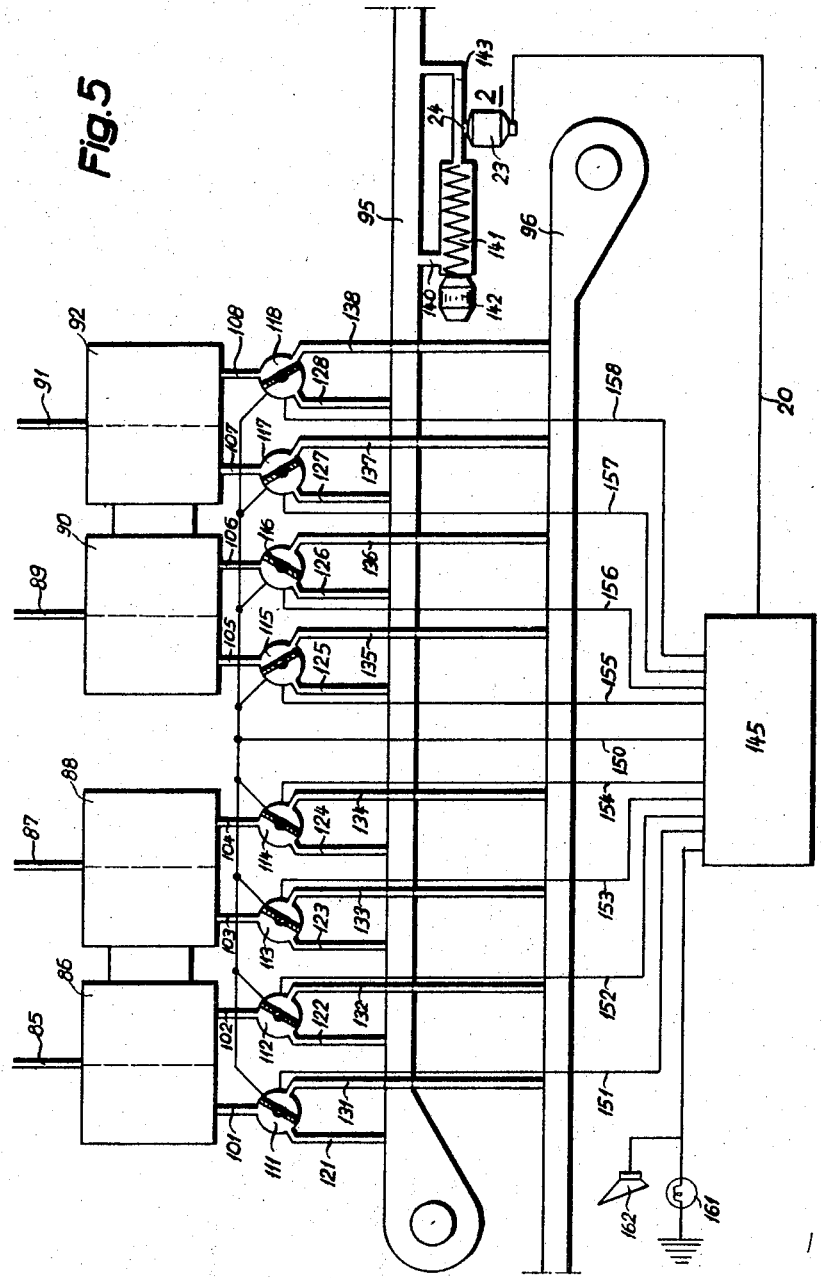

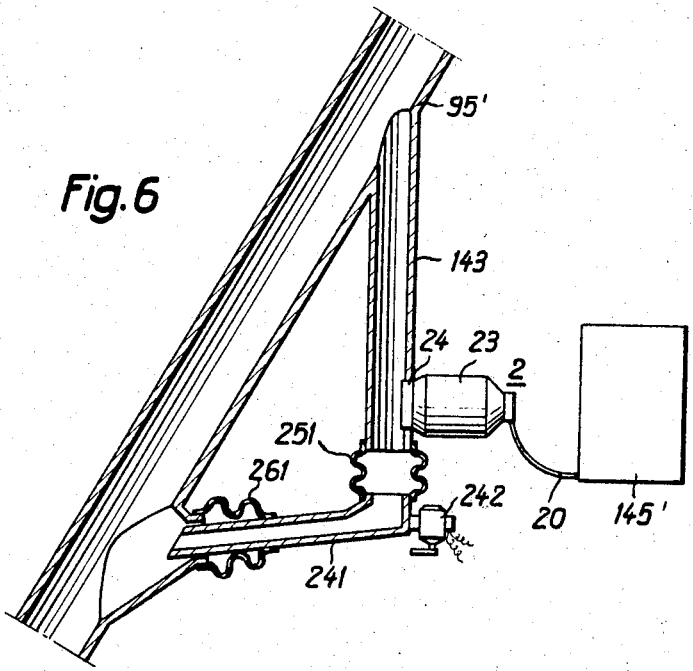
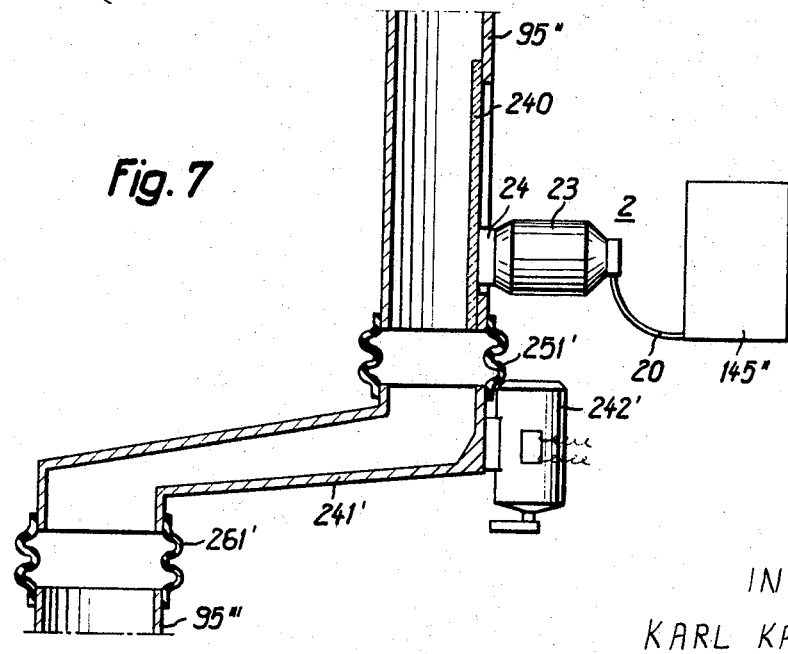
INVENTOR
KARL KARRER

United States Patent Office 3,321,636
Patented May 23, 1967

3,321,636
PHOTOSENSITIVE APPARATUS FOR COLOR TESTING AND COLOR CONTROL IN A PROCESSING PLANT
Karl Karrer, Saint Gall, Switzerland, assignor to Gebrüder Bühler, Uzwil, Switzerland, a company of Switzerland
Filed Aug. 29, 1963, Ser. No. 305,347
Claims priority, application Switzerland, Aug. 31, 1962, 10,382/62
21 Claims. (Cl. 250—218)

This invention relates in general to devices for testing materials and in particular to a new and useful device for testing materials for color characteristics, and for the color control of materials in a combining process.

The manufacture of flour in modern mills takes place in several working operations from which flour of different grades and brightness can be obtained as intermediate products. It is an endeavor of every flour mill to produce a final product of a generally uniform quality and a definite brightness by mixing flour of different grades in various suitable proportions to maintain a constant level of brightness in the final product. In the endeavor of enabling as reliable and reproducible a determination of the flour brightness as possible, various methods and means have already been proposed. The Pekar test, known for a long time already, is based on purely comparative observation.

It was then found, that the colour of the flour depends on its ash content, which led to the development of equipment enabling its determination. The results obtained by the ash determination may, within certain limits, be considered as equivalents of the colour of the flour.

More recently means for direct measurement of the brightness, using photo-electric elements, have been developed. The use of optical filters to compensate the colour-sensitivity of such equipment is also known. Further proposals dealt with compensation circuits enabling irradiation of a test sample and a reference standard simultaneously comprising means to compare the two photo-electric currents obtained. It is also known to measure the colour or brightness by sending a beam of light across or through a test sample and a second beam through a reference standard onto photo-electric elements. A galvanometer indicates the prevailing relative conditions in the two circuits which are balanced by means of a diaphragm disposed in the path of one of the light-beams. The opening of the diaphragm then represents an equivalent of brightness of the test sample.

It is further known to use dry as well as wet, pulpy or pasty, test samples for the determination of the colour or the brightness of the flour. While brightness test results obtained from dry samples usually depend on the granulation of the test sample. This influence is largely avoided when moist samples are used. The reproducibility has, however, frequently proved insufficient, while the preparation of pulpy or pasty test samples requires greatest care and relatively much time. A further disadvantage consists in the fact that the brightness of moist flour samples does not remain constant, but changes on account of enzymatic influences. All measurements of the brightness have therefore to take place at an exactly specified time, for example 60 seconds after admixing the liquid.

It is an object of this invention to design a handy unit for testing dry as well as moist samples of flour, dough or paste, and bread crumbs.

The invention relates to an improved apparatus for photo-electric determination of the brightness of dry as well as of moist samples of flour milling and dough products such as flour, semolina, bread and the like, comprising means for compacting the test sample facing the objective of a photo-electric reflection measuring unit.

A further development of the basic concept of the invention includes means for compacting the specimen against the objective.

Still further developments of the invention deal with details of the measuring unit.

Still further developments of the invention deal with the equipment as a control means in connection with production and processing plant.

Figure 2:
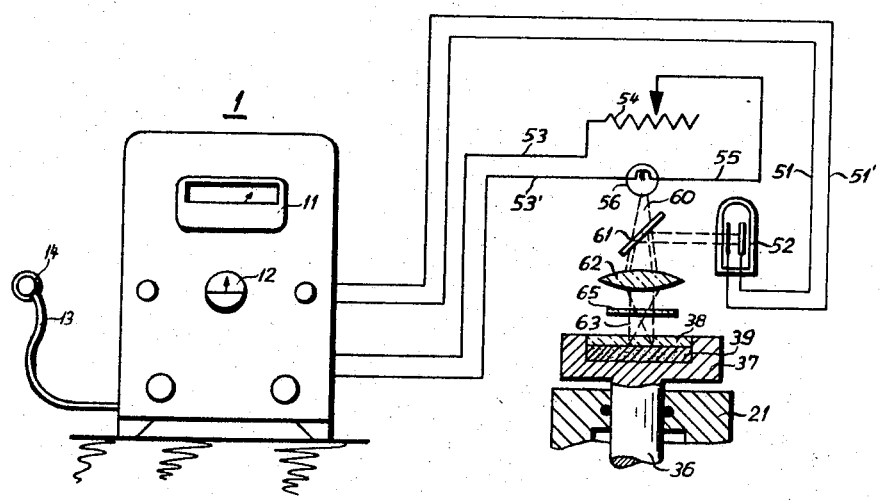
Figure 3:
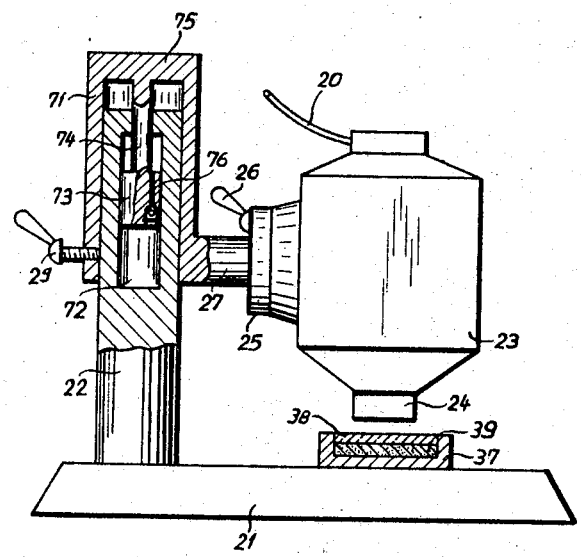
Figure 4:
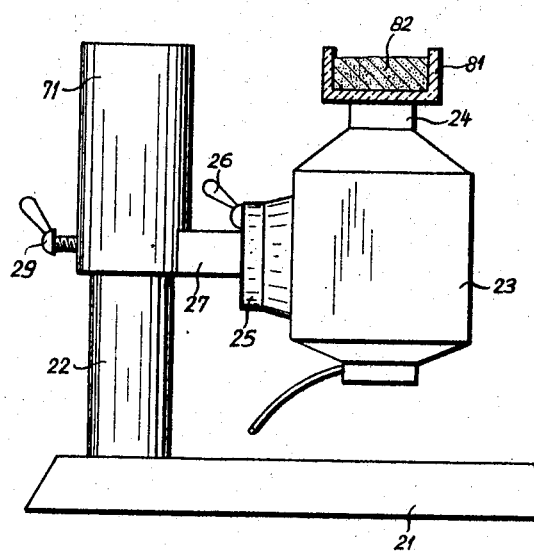

Other objects and advantages of this invention will become apparent from the following detailed description with reference to the appended drawing, showing in FIG. 1, an apparatus for measuring the brightness of dry flour specimens according to this invention, FIG. 2, a diagrammatic representation of the working principle of the equipment shown in FIGURE 1, FIG. 3, the measuring equipment of this invention, having an optical system which can be lowered onto the test specimen under the influence of its own weight and means for damping downward movement, FIG. 4, the testing apparatus for moist specimens, FIG. 5, the testing equipment according to this invention disposed in a by-pass at the common discharge end of a production plant and including means for continuous control thereof;

FIG. 6 is a partial sectional and elevational view of an alternate embodiment of construction for the apparatus indicated in FIG. 5; and FIG. 7 is a view similar to FIG. 6 of still another embodiment of construction.

The photo-electric brightness measuring equipment for testing flour milling and dough products basically includes an amplifier unit 1, a measuring unit or measuring head 2 and compacting means 3 for compressing the test samples or specimens disposed for relative adjustment against measuring head 2 as shown in FIGURE 1. The amplifier 1 also includes indicating means 11 and 12. The measuring unit 2 is adjustably disposed on a preferably vertical column 22 fixed on a base plate 21. The head position 23 of the measuring unit 2 housing the optical system with the objective 24 is pivotably mounted on a bearing plate 25, disposed at one end of an arm 27 fixed with its other end in an adjusting ring 28 glidably arranged on column 22. Clamping means 29 and 26 are provided for fixing adjusting ring 28 carrying the measuring unit 2 at the desired height and in the angular positions respectively. Measuring head 23 and amplifier 1 are interconnected by means of a connecting cable 20. On the base plate 21 a cup-shaped specimen or test sample carrier 37, comprising means for hydraulic adjustment thereof is disposed, which include a cylinder bore 31 arranged in the base plate 21 and a piston 35 movably disposed therein. At each end of the cylinder bore 31 passages 32 and 33 respectively are provided for the operating fluid of piston 35, which has a sealing ring 34 disposed in a recess of its circumference. A piston rod 36 at the lower end of which piston 35 is fixed carries at its upper end the test sample cup 37 to take up the specimen which is then covered by suitable transparent protecting means 38 e.g. a glass or Plexiglas cover plate. Alternatively, the transparent protecting cover can be disposed on the objective 24 or the pacer-ring thereof. The hydraulic fluid passages 32 and 33 are connected by means of two fluid pipes 42 and 43 respectively with a four-way valve 41, which in turn is connected with an operating fluid-tank 45 by a return fluid pipe 44. A pressure-fluid conduit pipe 46 connects the four-way valve 41 with a fluid pump 48 and a pressure setting valve 47, which is further connected with the fluid tank 45 by a second return conduit 44'.

Referring now to FIG. 2 of the drawing representing the operating principles of the testing equipment, the amplifier unit 1 is connected with a photo-electric element 52 disposed within the measuring head 2 by means of a circuit comprising two conductors 51 and 51′, while a suitable electric light source 56 also accommodated within housing 23 of measuring head 2 is fed by another electric circuit comprising conductors 53 and 55, a variable resistor 54 and conductor 53′. A light beam 60 produced by a lamp 56 passes through a semi-transparent mirror 61 and a lens 62 onto specimen 39, a suitable and preferable interchangeable filter 65 may be interposed between the lens 62 and sample 39. The size of the spot produced by light beam 60 on the surface of the specimen 39 depends on the distance between this latter and the object lens 62. A reflected light beam 63 will be deflected by the semi-transparent mirror 61 onto the photo-electric element 52, where it generates a corresponding control signal which is immediately transmitted to the amplifier unit 1. The variable resistor 54 enables adjustment of the energy consumed by the lamp 56 resulting in a corresponding adjustment of the intensity of the light beam as well as the sensitivity of the unit. An ammeter 12 indicates the magnitude of the lamp current.

The energy required for the testing equipment is drawn from a plug socket 14 by means of a flexible cord 13.

The arrangement described above works as follows:

Before testing a sample, a reference standard, for example a plate having a purest grade white surface, is placed against the object lens 24 unless one or more reference standards are built-in within the housing of the testing or measuring head. An initial test is then carried out by sending a light-beam 60 reflected by the reference standard onto the photo-electric element 52, which serves for calibration of the amplifier setting represented by the pointer deflection of the indicating instrument 11.

After calibration of the apparatus the test sample 39 is filled into cup 37 and covered by the glass or Plexiglas cover 38 as shown in FIGS 1 and 2. The measuring or testing head 23 is then lowered close to the specimen 39. Upon setting the four-way valve 41 into the position shown in FIG. 1 the cup 37 with the specimen 39 therein, disposed at the top end of the piston rod 36 is then compressed against the objective 24 of measuring head 23 by the piston 35 in accordance with the hydraulic pressure pre-set at the pressure setting valve 47. Owing to the uniform pressure exerted by the objective upon each individual sample of a series of tests unfavourable influences due to packing or granulation are reduced to a minimum. The irradiated surface area of the specimen 39 may be altered by using different spacing rings on the objective 24, which further provides a means for altering the sensitivity of the equipment in addition to the adjustment of the intensity of the light beam 60. In this arrangement it has proved convenient to use an interference filter having an absorption minimum at wavelength of 550μ approximately. For certain purposes, however, for example the supervision of the progress of purification in semolina purifiers it has proved favourable to use the entire spectrum of the unfiltered light. Owing to the possibility to use various filters 65 a variety of conventional tests, such as the tristimulus test and control test in connection with flour bleaching may be carried out with the equipment of this invention.

A significant advantage of the equipment described is that it enables testing dry flour specimens relatively rapidly by comparatively simple manipulations giving accurate and easily reproducible test results.

A second embodiment of this invention, shown in FIG. 3 also includes a vertical, conveniently cylindrical column 22 fixed on a horizontal base plate 21. The measuring head 23 with the objective 24 is pivotably mounted on a bearing plate 25 disposed at one end of an arm 27 fixed with its other end in an adjustable sleeve 71 glidably arranged on column 22. Clamping means 29 and 26 are provided for fixing adjustable sleeve 71 and measuring head 23 respectively at the height and in the angular position required.

In the column 22 a cylindrical bore 72 is arranged for a piston 73 disposed at one end of a piston rod 74, the other end of which is fixed against the inside face of the cover plate 75 of movable sleeve 71. In the piston 73 a throttle-valve 76 is disposed which enables the fluid to pass very slowly from the chamber below to the one above the piston, but provides free passage in the opposite direction. As shown in FIGURE 3 the test sample cup 37 containing the specimen 39 and covered with a transparent or Plexiglass cover 38 may be placed onto base plate 21 for testing. Alternatively, the covering member 38 may also be fixed against the mounting fixture of the object lens 24 instead of being placed on the test sample contained in the specimen cup.

In this embodiment outfit of the measuring head 23 and working principle correspond with the features already described with reference to FIGURE 2, with the exception, however, that compression of the test sample takes place under the influence of the weight of the measuring unit 23 when it seats on the sample 39 at the end of the lowering movement. This embodiment is therefore considerably more simple in its construction than the one described in connection with FIGURES 1 and 2 and enables testing dry as well as moist specimens such as dough, pastes or pulps, as will be explained with reference to FIGURE 4, showing the measuring unit 23, turned by 180° with the object lens 24 facing upwardly. In this position a conventional test cup 81 having a flat glass bottom and containing the moist specimen 82 is placed onto the fixture of the object lens 24.

The two examples described with reference to FIGURES 1, 2 and 3, 4 respectively, show an extraordinary universal application field of the new testing equipment, including all conventional tests hitherto carried out on flour products, using dry as well as moist specimens. The equipment also facilitates testing products of semolina purifiers. The reproducibility of the test results is particularly largely ensured in dry sample tests which preclude the influences of enzymatic deterioration of the specimens. This particularly applies to materials of relatively uniform granulation. The fact that the new equipment enables obtaining dry test results of great accuracy very rapidly, makes it possible to control flour milling plants automatically in accordance with the brightness of the final product.

In FIGURE 5 an embodiment of the new equipment in combination with a production plant, for automatic control of the common flour output is represented by way of example. The flour discharged by various individual passages through ducts 85, 87, 89, 91, is fed into the last-stage sifters 86, 88, 90, 92, for example of the plansifter-type, the discharge of which takes place through ducts 101–108 communicating with duct switches 111–118, which further communicate through ducts 121–128 with the common flour discharge tract 95, for example a screw or a chain conveyor, on the one hand, and, through ducts 131–138 with a further discharge means 96 on the other hand. This latter removes the dark-grade flours. After the junction of the last discharge duct 128 with the common main discharge tract 95, in the direction of the material flow, a by-pass system comprising a first conduit 140 having a relatively small cross-section, a screw conveyor 141 driven by a motor 142, and a second conduit 143, having a relatively small cross-section, through which a small quantity of the product is by-passed for testing purposes and joins again the main discharge tract 95. To this end, conduit 143 is made at least partially of a transparent material, such as glass or the like. Within the range of the transparent portion of conduit 143 the measuring head 2, 23 of the new testing equipment is disposed with its object lens 24 directed against the center of the conduit. The measuring unit 2, 23 is electrically connected with an amplifying and control unit 145 by electric conductor means represented in the drawing by the line 20. The control unit 145 in turn is connected with individual operating means attached to each of the duct switches 111–118 by control lines 151–158 respectively, a common return line 150 leading back to the control unit 145.

The combination described hereinbefore works as follows:

In the arrangement and the position of the duct switches shown in FIGURE 5 different grades of flour forming the individual components of different brightness are delivered by the ducts 121, 122, 123, 124 and 126 to the common main discharge truck 95 to form the final product. The flour grades delivered by the ducts 135, 137 and 138 are collected as secondary grade flour by tract 96. A small portion of the flour drops from the main discharge track 95 through the vertical pipe 140 into screw conveyer 141 to pass by the object lens 24 of the measuring unit 2, 23 under the influence of a predetermined pressure exerted by the conveyer screw. Variations of the colour or the brightness of the flour within a certain specified period exceeding a certain predetermined value provoke corresponding variations of the photo-electric circuit current and in turn transmission of a corresponding energizing signal from the control set 145 to one of the duct switches 111–118. If for example the flour in track 95 becomes darker, the position of duct switch 115 may change for discharge into track 95 and the one of duct switch 116 for discharge into track 96. Accordingly a darker grade may be added for example from duct 107 by changing the position of duct switch 117 for discharge into track 95 instead of unit 96 through duct 127. With reference to FIGURE 5 a fully automatic, self-acting flour discharge control operating in accordance with the flour brightness was disclosed. It is believed that from prior art control equipment actuating some kind of acoustic or optical warning signal only, as exemplified by the reference numbers 162 and 161 respectively, is known.

It may also be convenient to provide in the discharge truck 95 a conduit switch of the kind exemplified in FIG. 5 by the reference numbers 111–118, suitably disposed to change the material flow in the event of extraordinary deviation of the flour brightness to discharge into a separate reserve cell instead of into the normal or usual storage cell. This arrangement avoids contamination of the stock of accurate brightness by material of inadequate colour.

As already mentioned, the brightness control shown in FIGURE 5 represent an example only, and can also be realized by other means. With this in mind, it is for example possible to dispose the by-pass vertically, whereby the test sample material dropping from the main track 95 is by-passed through a turn-stile gate and return after testing to the main track by means of a vibrating conveyer or the like substituting the screw conveyer 141. This arrangement includes the advantages of providing uniform compression of the test sample as defined by the dropping depth, and enabling entrapped air to escape, thereby avoiding the formation of air inclusions which might falsify the test results.

If desirable, it is also possible to provide suitable means in combination with the control set 145 for controlling the temperature of the milling rolls which influences the brightness and quality of the product.

The control unit 145 may further be used to control of individual milling rolls processing darker flour grades, which also provides a means of altering the brightness and the quality of the product or products obtained.

In some of the arrangements described an integrating unit will be required in combination with the control unit 145 to obviate erroneous control signals due to occasional inhomogeneities in the specimens.

FIG. 6 indicates an alternate embodiment of a construction of a mechanism similar to that indicated in FIG. 5. In this embodiment, the main track or conduit 95' extends at an angle from the vertical and the bypass conduit means includes a substantially horizontal section 241 which is connected to the main conduit 95' by a flexible seal connection 261. A vertical return conduit portion or section 143' connects back into the main conduit 95' at its upper end and is flexibly connected by a flexible seal 251 at its lower end to the conduit 241. In this embodiment, a vibratory means 242 produces a movement of the material through the conduit section 241 and upwardly into the section 143' in which the material is uniformly compacted before a housing 23 for the optical equipment similar to the embodiments of FIGS. 1, 3 and 4. The sensed variations of light intensity are delivered through the electrical conductor means 20 to an amplifying and control unit 145' as in the embodiment of FIG. 5.

In the embodiment of FIG. 7, two main conduit sections 95''' and 95'' are separated by a substantially horizontal section 241' which is supported by vibratory movement by flexible seals 261' and 251' to the respective conduit sections 95''' and 95''. A vibrator 242' causes movement of the material through the section 241' and the uniform compacting thereof in a lowermost portion of the main conduit 95''. In this embodiment, the conduit 95'' is provided with an opening in which is positioned a viewing glass 240 past which the material is advanced. As in the previous embodiment, the sensing means including the housing 23 and the objective 24 is located in the wall of conduit 143' adjacent the viewing glass 240 to sense the characteristic of the materials passing thereby. The indications sensed are directed through the electrical conduit 20 to an amplifying and control device 145'' for regulating the material being fed in accordance with the colour characteristics thereof.

The equipment of this invention has proved extremely universally applicable for all conventional tests hitherto known and used, such as for testing the colour of dry flour specimens, flour pulp, dry semolina, crumbs of bread, alimentary paste products, such as spaghetti, macaroni and the like, for testing the bleaching degree of dry as well as pasty or pulpy flour product specimens, and complete tristimulus tests complying with international standards.

The fact that optical filters may be used, the field of application of the new equipment is not confined to the flour milling industry only. Experimental tests have indicated the suitability of the new equipment for colour testing in the enamel and plastics industry as well as for comparative testing the colour of teeth. A further advantage deserving attention doubtless consists in the use of only a single light source, and a single photo-electric cell in combination with a semi-transparent mirror. The adjustability of the lamp current provides a simple means of adjustment of the unit for the optimum indicating ranges of the various application fields.

I claim:

1. A device for testing liquid and solid materials, such as flours, pastes and the like for colour, comprising a uniform light source, photo-electric cell means adjacent said light source, and means for supporting material to be tested in the path of rays from said light source and for uniformly compressing the material, said photo-electric cell means being located to be influenced by the light intensity reflected from the material under the influence of said light source.

2. A device for testing liquid and solid materials, such as flours, pastes and the like for colour, comprising a uniform light source, photo-electric cell means adjacent said light source, a housing, said light source and said photo-electric cell means being located in said housing, means for supporting material to be tested in the path of rays from said light source, said photo-electric cell means being located to be influenced by the light intensity reflected from the material under the influence of said light source, and mounting means for said means for supporting material to be tested and said housing permitting relative movement of said housing and said means for supporting material to be tested for compacting the test samples against said housing.

3. A device for testing liquid and solid materials, such as flours, pastes and the like for colour, comprising a uniform light source, photo-electric cell means adjacent said light source, a movable sample carrier for supporting material to be tested in the path of rays from said light source, said photo-electric cell means being located to be influenced by the light intensity reflected from the material under the influence of said light source, a housing, said light source and said photo-electric cell means being located in said housing, and mounting means for said means for supporting material to be tested and said housing permitting relative movement of said housing and said means for supporting material to be tested for compacting the test samples against said housing, and pressure means for displacing said movable sample carrier toward and away from said housing.

4. A device for testing liquid and solid materials, such as flours, pastes and the like for colour, comprising a uniform light source, photo-electric cell means adjacent said light source, means for supporting material to be tested in the path of rays from said light source, said photo-electric cell means being located to be influenced by the light intensity reflected from the material under the influence of said light source, a housing, said light source and said photo-electric cell means being located in said housing, and mounting means for said means for supporting material to be tested and for said housing permitting relative movement of said housing and said means for supporting material to be tested for compacting the test samples against said housing, comprising a supporting column, said housing being movably supported on said column, and pressure means for displacing said housing along said column.

5. A device according to claim 4 wherein said pressure means includes a fluid pressure cylinder, a piston slidable in said cylinder and carrying said housing, and passage means defined in said piston permitting slow downward movement of said housing on said column and relatively unhindered upward movement of said housing on said column.

6. A device for testing liquid and solid materials, such as flours, pastes and the like for colour, comprising a uniform light source, photo-electric cell means adjacent said light source, means for supporting material to be tested in the path of rays from said light source, said photo-electric cell means being located to be influenced by the light intensity reflected from the material under the influence of said light source, housing means containing said light source and said photo-electric cell means, means for supporting said housing and said means for supporting material to be tested being adjustable for relative upward and downward movement and for relative rotative movement, said means for supporting material to be tested comprising a transparent container adapted to be supported on said housing.

7. A device for testing liquid and solid materials, such as flours, pastes and the like for colour, comprising a uniform light source, photo-electric cell means adjacent said light source, means for supporting material to be tested in the path of rays from said light source, said photo-electric cell means being located to be influenced by the light intensity reflected from the material under the influence of said light source, said means for supporting material to be tested in the path of rays from said light source comprising a material conduit for the movement of material therethrough, and screw conveyor means for directing the material under pressure through said conduit.

8. A device for testing liquid and solid materials, such as flours, pastes and the like for color, comprising a uniform light source, photo-electric cell means adjacent said light source, means for supporting material to be tested in the path of rays from said light source, said photo-electric cell means being located to be influenced by the light intensity reflected from the material under the influence of said light source, said means for supporting material to be tested in the path of rays from said light source comprising a material conduit for the movement of material therethrough, and screw conveyor means for directing the material under pressure through said conduit, a first conveyor line for materials of a selected color, a second conveyor line for materials of an alternate color, at least one means for feeding materials to said first conveyor line, by-pass valve means for connecting said means for feeding materials to said first conveyor line for directing materials to said second conveyor line, said conduit being located in said first conveyor line, and means connected between said photo-electric cell means and said by-pass valve means for shifting said by-pass valve means when the material passing through said conduit is of a predetermined color whereby the material is then directed to said second conveyor line.

9. A system for feeding materials, such as flour, paste and the like, comprising a first conveyor for materials of a selected color, a second conveyor for materials of an alternate color, means for feeding materials to said first conveyor, by-pass valve means connected to said means for feeding materials to said first conveyor and connected to said second conveyor, color measuring means, a by-pass conduit connected to said first conveyor, said color measuring means being located in said by-pass conduit, means for delivering material from said first conduit to said by-pass conduit under pressure for testing under a predetermined pressure condition by said color measuring means, and control means connected to said color measuring means and to said by-pass valve means for discontinuing feed to said first conveyor and commencing feed to said second conveyor upon the attainment of a predetermined color.

10. A device for testing liquid and solid materials, such as flours, pastes and the like for color, comprising a mounting base, a column supported on said mounting base, a measuring unit, means supporting said measuring unit on said column for vertical upward and downward movement and for rotative movement, a material sample carrier having a recess on the top surface for receiving material to be tested, a pressure cylinder supported on said mounting base, a piston slidable in said pressure cylinder and carrying said sample carrier at its upper end and means for selectively directing a fluid under pressure to alternate sides of said piston for moving said piston with said sample carrier relative to said measuring unit and for pressing the carrier against said measuring unit.

11. A device, according to claim 10, including means for applying a uniform upward pressure on said piston to urge the sample against said measuring unit with uniform pressure during testing.

12. A device for testing liquid and solid materials, such as flours, pastes and the like for color, comprising a mounting base, a column suported on said mounting base, a measuring unit, means supporting said measuring unit on said column for vertical upward and downward movement, a material sample carrier for receiving material to be tested, a pressure cylinder supported on said column, a piston slidable in said pressure cylinder and carrying said measuring unit and means for selectively directing a fluid under pressure to alternate sides of said piston for moving said piston with said measuring unit relative to said sample carrier.

13. A continuous operating device for testing continuous flowing wet and solid materials comprising a light source, photo-electric cell means adjacent said light source located to be influenced by said light source, a main conduit for the continuous movement of material therealong, a bypass conduit connected at each of its ends to said main conduit for removing material from said main conduit for sampling and for returning it to said main conduit, said photo-electric cell and said light source being located in said bypass conduit, and conveyor means for uniformly compressing and feeding material along said bypass conduit past said photo-electric cell means and to intercept said photo-electric cell means and said light source for varying the influence on said photo-electric cell means in accordance with the material being fed.

14. A continuous operating device, according to claim 13, wherein said conveyor means is a vibratory conveyor.

15. A continuous operating device for testing continuous flowing wet and solid materials comprising a light source, a photo-electric cell adjacent said light source, a main conduit for the continuous movement of material therealong, a bypass conduit connected at each of its ends to said main conduit for removing material from said main conduit for sampling and for returning it to said main conduit, and conveyor means for uniformly compressing and feeding material along said bypass conduit past said photo-electric cell and to intercept said photo-electric cell and said light source, said bypass including an upwardly extending duct portion leading from said conveyor means to said main conduit, said duct having a transparent portion at the location of said light source and said photo-electric cell, said photo-electric cell and said light source being located in said bypass conduit in a position so that said cell is influenced by the light from the light source on the material in said duct transparent portion.

16. A continuous operating device for testing continuous flowing wet and solid material comprising a main conduit for the continuous movement of material therealong, a light source influencing the material moved in said main conduit, photo-electric cell means adjacent said light source located to be influenced by the influence of said light source on the material, vibratory conveyor means associated with said main conduit for uniformly compressing and advancing material along said main conduit past photo-electric cell means and to intercept said photo-electric cell means and said light source for varying the influence on said photo-electric cell means in accordance with the material being fed.

17. A continuous operating device for testing continuous flowing wet and solid material comprising a light source, photo-electric cell means adjacent said light source located to be influenced by said light source, a main conduit for the continuous movement of material therealong, vibratory conveyor means associated with said main conduit for uniformly compressing and advancing material along said main conduit past photo-electric cell means and to intercept said photo-electric cell means and said light source for varying the influence on said photo-electric cell means in accordance with the material being fed, said vibratory conveyor being located in said main conduit, said photo-electric cell means including an objective, said main conduit having a transparent wall adjacent which said objective is located.

18. A device for testing liquid and solid materials according to claim 2, including means disposed between said light source and said means for supporting material to be tested for varying the irradiated surface area of said material to be tested.

19. A device for testing liquid and solid materials according to claim 2, including means in said housing for establishing a calibration standard for indicating the influence on said photo-electric cell for comparison in respect to the influence of light reflected by the sample material to be tested.

20. A device for testing liquid and solid material according to claim 2, including a filter disposed beween said light source and said means for supporting material to be tested.

21. A device for testing liquid and solid materials according to claim 2, including means disposed between said light source and said means for supporting the material to be tested for varying the light beam emitted by said light source.

References Cited by the Examiner

UNITED STATES PATENTS 2,665,388    1/1954    Bickley _____ 250—237

RALPH G. NILSON, *Primary Examiner.*

M. ABRAMSON, *Assistant Examiner.*